United States Patent Office 3,090,654
Patented May 21, 1963

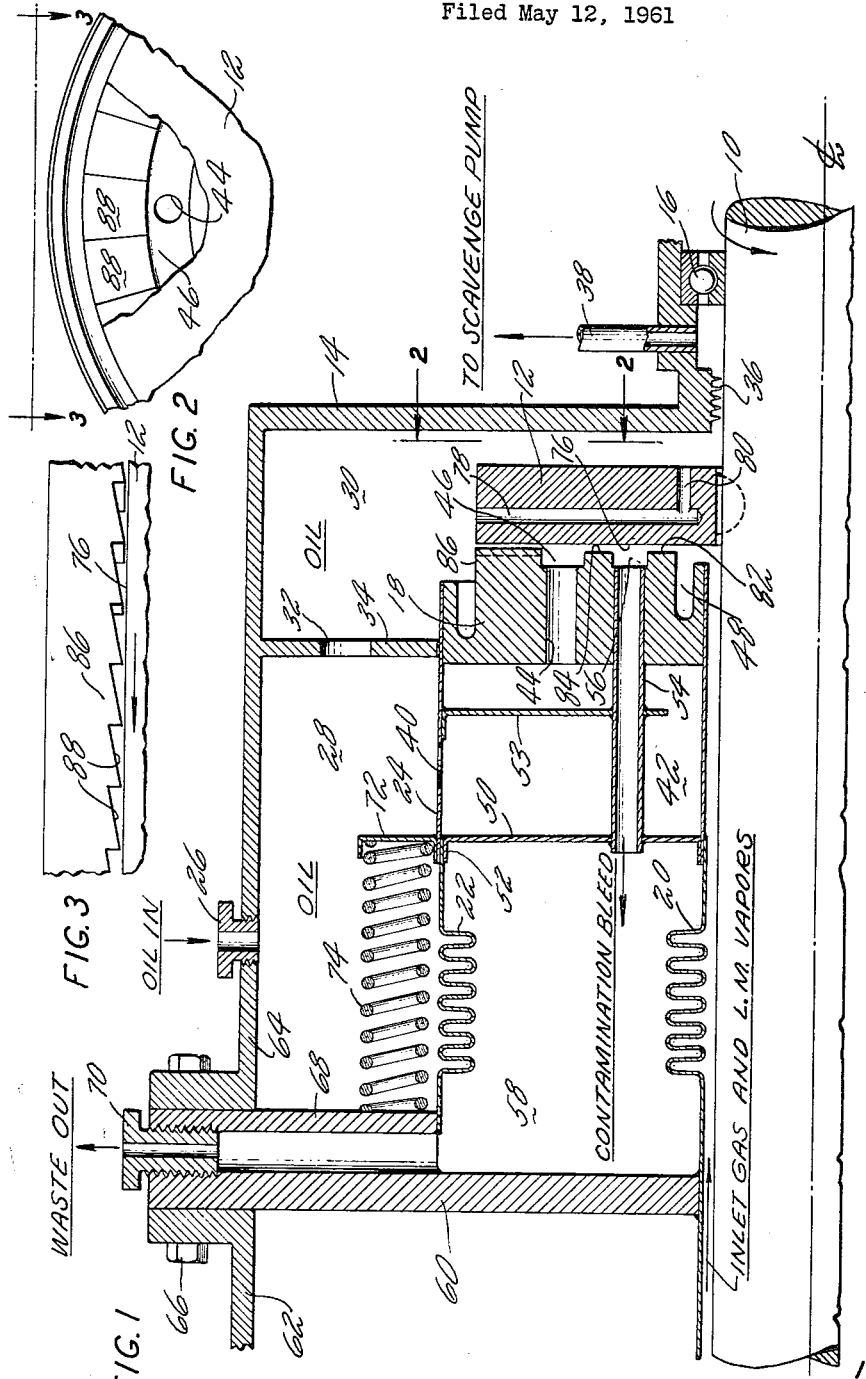

3,090,654
CONTROLLED-GAP SEAL WITH HYDRO-DYNAMIC-THRUST BEARING
David Wald, Santa Clara, Calif., Ralph S. Lombard, Rockfall, Conn., and Elwin F. La Moy, Eau Gallie, Fla., assignors to United Aircraft Corporation, East Hartford, Conn., a corporation of Delaware
Filed May 12, 1961, Ser. No. 109,711
9 Claims. (Cl. 308—36.3)

This invention relates to seals for liquid-metal pumps and has as its main object the provision in such a pump of improved sealing means between the pump-bearing oil supply and the inert gas blanket which is maintained between the oil supply and the liquid metal being pumped.

Another object of this invention is the provision of a positive face seal comprising relatively stationary and rotatable face-seal members having a hydrodynamic-thrust bearing for controlling the face-seal gap.

A further object of this invention is generally to improve the seals between the inert gas and lubricating oil supplies for centrifugal liquid-metal pumps.

These and other objects and advantages of the invention will be evident or will be pointed out in connection with a preferred embodiment of the invention shown in the accompanying drawing.

In this drawing:
FIG. 1 is a longitudinal, sectional view of the sealing means of this invention;
FIG. 2 is a detail of the hydrodynamic-thrust bearing taken on line 2—2 of FIG. 1; and
FIG. 3 is a view taken on line 3—3 of FIG. 2, further illustrating this thrust bearing.

A pump shaft 10 rotates at high speed in the direction of the arrow shown in FIG. 1 with the rotatable seal member 12 rigidly attached to the shaft. The shaft is supported in the pump housing 14 on ball bearings, one of which is shown at 16. The nonrotatable seal member 18 is attached to concentric inner-and-outer bellows 20 and 22 by means of a sheet-metal weldment 24. The nonrotatable seal member is thus free to move axially toward and away from the rotatable seal member 12.

Lubricating oil under pressure is admitted to housing 14 through an inlet fitting 26 and occupies chambers 28 and 30 which are maintained in fluid communication by a series of openings 32 in the annular barrier 34. Oil is thus free to pass in limited volume through a labyrinth seal 36, which surrounds shaft 10, and lubricate bearing 16, after which it returns to the scavenge pump through conduit 38. Oil in chamber 28 passes freely through openings 40 in weldment 24 into chamber 42 within this weldment from which it has access through a series of annularly arranged passages 44 in the nonrotatable seal member to an annular chamber 46 between the rotatable and nonrotatable seal members.

The fluids being sealed are the lubricating oil which has access to annular chamber 46 and the inert blanket gas which enters under pressure between the shaft and the inner bellows 20 and weldment 24 into the annular chamber 48 in the face of the nonrotatable seal member. This inert gas which is contaminated by some liquid-metal vapors is provided for the purpose of preventing even a trace of the lubricating oil from ever getting in contact with the liquid metal being pumped.

The weldment 24 is an annular sheet-metal structure in the right-hand end of which the nonrotatable seal member 18 is received and to which it is welded to provide a fluid-tight closure of the weldment at this end except for passages deliberately provided. The inner and outer side walls of the weldment 24 overlap the tubular ends of bellows 22 and 24 to which they are also welded. The left-hand end of the weldment 24 is closed by a barrier 50 having an annular flange 52 which overlies and is welded to the ends of bellows 20 and 22, thus forming a fluid-tight closure for this end of the weldment. An annular baffle 53 is placed in chamber 42 in order to aid the circulation of oil in this chamber and to maintain the weldment at a uniform temperature. A series of bleed tubes 54 are provided which extend from an annular chamber 56 in the face of the nonrotatable seal member through this seal member, through baffle 53, and through closure member 50 into chamber 58 between the bellows 20 and 22. This chamber has a back wall 60 which is welded to the inner bellows 20. Wall 60 has a thickened outer portion 68 connected to bellows 22 and clamped between the housing members 62 and 64 by the bolted connection 66. Wall portion 68 has a radial passage terminating in a fluid-outlet connection 70 connected to fluid waste.

Weldment 24 also has an external cup-shaped annular member 72 welded thereto, which forms an abutment for one end of a series of compression springs 74, the other ends of which engage wall 68. The springs constantly bias the weldment 24 to the right in FIG. 1. In this movement the barrier 34 serves as a guide for the weldment and the nonrotatable seal member carried thereby.

Considering the seal members more in detail, it will be noted that the rotatable seal member is an annular flat disc secured to the shaft and outstanding radially therefrom. The flat annular face 76 constitutes the sealing face of this seal member. Radial cooling passages 78 are provided in seal member 12 which communicate with axial passages 80 and serve to circulate fluid and maintain the sealing member cool.

The cooperating nonrotatable sealing member 18 is provided with three annular lands which are concentric and spaced from each other by the previously mentioned chambers 46 and 56. The first land 82, which is the land of smallest diameter, separates the inert gas in chamber 48 from chamber 56 which is the bleed chamber; the second land 84 separates the oil supply in chamber 46 from the bleed chamber 56; and the third land 86 is a hydrodynamic-thrust bearing, the details of which are shown most clearly in FIGS. 2 and 3.

Land 86, unlike the lands 82 and 84, does not present a flat annular surface, but rather comprises a plurality of tapered land-thrust surfaces 88, the plain surfaces of which are inclined toward the flat surface 76 of the rotatable seal member in the direction of rotation of the latter, as will be evident from the arrow indicating the direction of rotation of seal member 12 in FIG. 3. The purpose of this hydrodynamic-thrust bearing is to maintain a fixed predetermined clearance between the rotating and nonrotating seal members at the lands 82 and 84 thereof, thus to control the escape of inert gas past land 82 and the escape of lubricating oil past land 84.

Due to the high speed of rotation of seal member 12, wedge-shaped oil films are established between the thrust surfaces 88 and the flat seal-face member 12 to provide the desired controlled clearances for lands 82 and 84. The purpose of the oil-bath feature, by which the lubricating oil is allowed to circulate in back of and through the nonrotatable seal member 18, is to maintain 18 at a uniform temperature in order that thermal distortion will not upset the clearance at the sealing faces. By properly redesigning the thrust bearing and controlling the magnitude of the clearance gap at lands 82 and 84, the amount of leakage of the gas and the oil from chambers 48 and 46 may be kept reasonably small.

In the operation of the sealing means described above, lubricating oil supplied through connection 26 is maintained under pressure in the annular compartments 28, 30 and 42 throughout the operation of the pump by means of a usual pressure regulator, not shown. Oil bleeds off through the labyrinth seal 36 in sufficient quantity to maintain the lubrication of bearing 16, any excess oil in the region of the bearing being returned to the scavenge pump through conduit 38.

The nonrotatable seal member 18 under the action of springs 74 is constantly biased axially toward seal member 12. Due to the thrust created by the hydrodynamic-thrust bearing at land 86, a small but controlled gap is provided at each of the lands 82 and 84. Oil under pressure in chamber 46 and gas pressure in chamber 48 escape in very limited quantities past the annular gaps provided between these lands and seal face 76. Since chamber 56 is at a low pressure, there is no possibility of oil leakage into the gas-blanket chamber.

It will thus be evident that as a result of this invention sealing means has been provided to effect a positive seal between the inert gas blanket and the bearing oil-supply system of a centrifugal pump. It will further be evident that by having the oil supply under pressure and the gas supply under pressure separated by a chamber vented to a lower pressure, absolutely no contamination of the gas blanket or the oil can take place. It will further be evident that by the use of a hydrodynamic-thrust bearing to oppose the thrust of springs 74 acting on the nonrotatable seal member, it is possible to maintain the annular gaps between the cooperating seal faces extremely small, whereby to limit the loss of both oil and gas and yet have no wear.

While only one embodiment of the invention has been shown herein, it will be understood that numerous changes in the construction and arrangements of the parts may be resorted to without departing from the scope of the appended claims.

We claim:

1. In combination, a housing forming a seal chamber, a shaft extended through a wall of said housing into said chamber, a bearing between said shaft and said housing wall, a rotatable seal member in said chamber carried by and surrounding said shaft having an annular seal face, a cooperating nonrotatable seal member carried by said housing including an annular flat seal face surrounding said shaft and confronting the flat face of said rotatable seal member, said nonrotatable seal face having spaced concentric lands thereon forming inner, intermediate and outer annular concentric grooves, said rotatable and nonrotatable seal members dividing said seal chamber on one side of said rotatable seal member into an inner annular compartment adjacent said shaft and an outer annular chamber remote from said shaft, means for admitting oil under pressure into said outer chamber, means for admitting inert gas under pressure into said inner compartment, means for connecting said oil-containing chamber with said outer groove, means for connecting said gas-containing compartment with said inner groove, means for connecting said intermediate groove in said seal face to atmosphere, and a hydrodynamic-thrust bearing on the confronting faces of said seal members for controlling the gap between said lands and the annular face of said rotatable seal member.

2. The combination of claim 1 in which the nonrotatable seal member is carried by inner and outer annular bellows, each fixed at one end to said housing and at the other end to the periphery of said nonrotatable seal member.

3. The combination of claim 2 in which the intermediate groove in the nonrotatable seal member is vented first to the interior of the bellows chamber and from there to the atmosphere.

4. The combination of claim 2 in which a weldment is provided about the nonrotatable seal member which is guided for axial sliding movement in the housing and which connects the inner and outer bellows to said nonrotatable seal member.

5. The combination of claim 4 in which a plurality of compression springs arranged about the outer bellows bear against the weldment and urge the nonrotatable seal member constantly in an axial direction toward the rotatable seal member.

6. The combination of claim 4 in which the outermost groove in the nonrotatable seal member is connected by a passageway to the interior of the weldment and in which the interior of the weldment is in fluid communication with said outer oil-containing compartment.

7. The combination of claim 1 in which a passage is provided between said shaft and said housing leading to said bearing, a labyrinth seal is provided in said passage spaced from said bearing, and means is provided for venting the space between said labyrinth seal and said bearing.

8. In combination, a housing, a shaft extended through a wall of said housing, a bearing between said housing wall and said shaft, means for admitting oil under pressure to said housing for lubricating said bearing, means for admitting an inert blanket gas to said housing along said shaft to oppose said oil, and rotatable and nonrotatable seal means carried by said shaft and housing respectively between said body of gas and said body of oil, said rotatable seal means comprising an annular member having a flat radial seal face, said nonrotatable seal means comprising an annular member having a seal face confronting the seal face of said rotatable seal means, said nonrotatable seal face having three concentric annular grooves formed therein separated by inner and outer annular lands, means for connecting the outermost groove with said oil in said housing, means connecting the innermost grooves with said blanket gas, and means connecting the intermediate groove with the atmosphere external of said housing, and a hydrodynamic-thrust bearing on the confronting faces of said seal members for controlling the gap between said lands and the annular face of said rotatable seal member.

9. In combination, a housing providing a seal chamber, a shaft extended through a wall of said housing into said chamber, a bearing between said shaft and said housing wall, a rotatable seal member in said chamber carried by said shaft having an annular seal face, a cooperating seal member nonrotatably carried by said housing including a seal face confronting said rotatable seal face, said nonrotatable seal face having three spaced concentric annular lands thereon forming three annular grooves therebetween and between the innermost land said shaft, means for supplying oil under pressure to said chamber for lubricating said bearing, a passageway connecting said chamber to the outermost of said grooves, means for admitting leakage blanket gas along said shaft to the innermost groove, means for connecting the intermediate groove to atmosphere, and a hydrodynamic-thrust bearing on the confronting faces of said rotatable seal face and the outermost of said lands for controlling the gap between said lands and the cooperating face of said rotatable seal member.

References Cited in the file of this patent

UNITED STATES PATENTS 2,834,619    McNab    May 13, 1958
2,992,618    Means    July 18, 1961